(12) United States Patent
Lee

(10) Patent No.: US 9,708,025 B2
(45) Date of Patent: Jul. 18, 2017

(54) FOLDABLE MOTORIZED BICYCLE

(71) Applicant: Chunghsin Lee, Las Vegas, NV (US)

(72) Inventor: Chunghsin Lee, Las Vegas, NV (US)

(73) Assignee: FTR Systems, Inc, Las Vegas, NV (US)

( * ) Notice: Subject to any disclaimer, the term of this patent is extended or adjusted under 35 U.S.C. 154(b) by 80 days.

(21) Appl. No.: 14/545,981

(22) Filed: Jul. 13, 2015

(65) Prior Publication Data

US 2016/0137254 A1 May 19, 2016

Related U.S. Application Data

(60) Provisional application No. 62/123,292, filed on Nov. 13, 2014.

(51) Int. Cl.
| | |
|---|---|
| *B62K 15/00* | (2006.01) |
| *B62K 11/02* | (2006.01) |
| *B62M 7/12* | (2006.01) |
| *B62M 6/60* | (2010.01) |
| *B62K 3/00* | (2006.01) |

(52) U.S. Cl.
CPC ......... *B62K 15/008* (2013.01); *B62K 11/02* (2013.01); *B62M 6/60* (2013.01); *B62M 7/12* (2013.01); *B62K 3/002* (2013.01)

(58) Field of Classification Search
CPC .... B62K 15/008; B62K 11/02; B62K 15/006; B62M 6/60; B62M 7/12
USPC .......................................... 180/208
See application file for complete search history.

(56) References Cited

U.S. PATENT DOCUMENTS

| | | | | |
|---|---|---|---|---|
| 6,267,401 B1 * | 7/2001 | De Jong | ............. | B62K 15/008 280/287 |
| 6,336,649 B1 * | 1/2002 | Lin | ......................... | B62H 1/02 224/418 |
| 6,799,771 B2 * | 10/2004 | Bigot | ................... | B62K 15/008 280/278 |
| 6,942,235 B2 * | 9/2005 | Chang | ................... | B62K 15/00 280/278 |
| 8,430,414 B1 * | 4/2013 | Yap | ...................... | B62K 15/008 280/278 |
| 8,894,084 B1 * | 11/2014 | Yap | ...................... | B62K 15/008 280/278 |
| 2007/0210556 A1 * | 9/2007 | Hon | ..................... | B62K 15/008 280/287 |

(Continued)

OTHER PUBLICATIONS www.mogobike.com.*

(Continued)

*Primary Examiner* — Karen Beck
(74) *Attorney, Agent, or Firm* — Don Halgren

(57) ABSTRACT

A motorized foldable bicycle assembly arranged to be collapsible from an elongated four-sectioned segmented frame arrangement with a set of electronically controlled motorized front and rear wheels spaced longitudinally apart on the elongated frame arrangement. The front wheel and the rear wheel are arranged in an aligned, side-by-side adjacent configuration with a steering column supported handlebar arrangement correspondingly collapsed in a skewed or misaligned orientation in a space between the side-by-side wheels when folded up in an unridable configuration. The segmented frame arrangement generally forms a "M" configuration in the bicycle's folded and collapsed configuration.

18 Claims, 20 Drawing Sheets

(56) References Cited

U.S. PATENT DOCUMENTS

| | | | | |
|---|---|---|---|---|
| 2011/0024217 A1* | 2/2011 | Sluijter | ................ | B62K 11/10 |
| | | | | 180/208 |
| 2013/0087988 A1* | 4/2013 | Wang | ..................... | B62K 3/06 |
| | | | | 280/287 |
| 2014/0008882 A1* | 1/2014 | Liao | ..................... | B62K 3/002 |
| | | | | 280/40 |
| 2015/0266536 A1* | 9/2015 | Yap | ..................... | B62K 3/002 |
| | | | | 180/181 |
| 2016/0137254 A1* | 5/2016 | Lee | ..................... | B62K 11/02 |
| | | | | 180/208 |
| 2016/0244120 A1* | 8/2016 | Gerencser | ............ | B62K 15/008 |

OTHER PUBLICATIONS

Mogobike.com screenshot, web.archive.org/web/20130624130819/ http://www.mogobike.com/ Jun. 24, 2013.*
Mogobike User Manual, http://web.archive.org/web/20161025230336/http://www.mogobike.com/mogobike-user-manual.pdf, Oct. 25, 2016.*
Mogobike.com screenshot, https://web.archive.org/web/20141115035711/http://www.mogobike.com/ Nov. 15, 2014.*

* cited by examiner

FOLDABLE MOTORIZED BICYCLE

BACKGROUND OF THE INVENTION

Field of the Invention

The present invention relates to motorized bicycles and more particularly to a compactly foldable motorized bicycle, and is based upon Provisional Application 62/123,292, filed Nov. 13, 2014, and is incorporated herein by reference.

Discussion of Prior Art

Bicycles have reducible in size by various means of removing detachable wheels or by folding them in half at mid-frame. Theses bicycles are still large when reduced in size, and are not motorizably movable in their smaller folded configuration.

It is an object of the present invention to provide a foldable motorized bicycle which overcomes the disadvantages of the prior art.

It is an object of the present invention to provide an easily foldable, both heightwise and lengthwise which foldable motorized bicycle which is truly compact and motorizably functional in its folded form.

BRIEF SUMMARY OF THE PRESENT INVENTION

The foldable motorized bicycle of the present invention has a four-sectioned elongated frame comprising a one-sided rear wheel support frame hingedly attached at a front end thereof to an elongated mid-frame. The rear wheel support frame is attached to the mid-frame by a unique "slide plate" third or rearmost hinge. The elongated mid-frame is attached to an elongated front frame by a second or mid-frame "slide-plate" hinge.

The elongated front frame is connectively attached to a curvilinear steering column support frame by a first or front slide-plate hinge. The curvilinear steering column forward support frame has an uppermost end with a steering column support bearing therearound. The steering column has a lower end portion which is enclosed within the steering column support bearing. The steering column lower end portion has its lower end secured to a one-sided front wheel support frame. The one sided front wheel support frame rotatably secures a motorized front wheel drive and braking arrangement. The steering column has an upper end with a pair of handlebars pivotably arranged in a handlebar pivot housing. The generally vertical steering column has a steering column hinge which is angularly arranged with respect to the longitudinal axis of the steering column to permit the upper end of the steering column to be folded about the steering column hinge at an acute angel to be non-parallel when folded downwardly and to the side of the steering column support frame.

A pair of foot rest plates are arranged on the top of the first frame. The foot rest plates have a longitudinal hinge therebetween so as to permit the pair of foot rest plates to be folded compactly upwardly and arranged parallel and vertically to one another, out of when it is desired to put the motorized foldable bicycle into a collapsed configuration.

The folded configuration with the one-sided rear wheel support frame, the mid frame, the front frame, and the steering column forward support frame, may with a little consideration, constitute the lineage of a capitol "M" when viewed as a plan view as may be seen in FIG. 24, the three frame hinges comprising the "connected" points of the M.

The one-sided rear wheel support frame may be seen as arranged on the right-hand side of the rear wheel. The saddle is shown disposed over a battery housing arrangement. The second or mid-frame hinge is shown just rearwardly of the foldable foot rest plates. The one-sided front wheel support frame is shown directed towards the right-hand side of the front wheel.

The steering column holding the pair of handlebars has with a steering column hinge arranged at a slight angle with respect to the longitudinal axis of the steering column. The mid-frame and the front frame are shown connected by the second or mid-hinge, and the one-sided rear wheel support frame is shown connected to the mid-frame by the third or rear hinge. The first or front hinge is connected to the steering column forward support frame. The foldable motorized bicycle has a kickstand movable downwardly. The saddle or seat is held by a telescoping seat column whose length is adjustable.

The foldable motorized bicycle with the steering column hinge has a pivot axis arranged at an acute angle with respect to the longitudinal axis of the steering column, so as to permit the folding of the steering column downwardly, falling snugly and non-parallel to the lower portion of the steering column, to one side of the bicycle in its collapsed orientation.

The foldable motorized bicycle has a first or front hinge member and a third or rear hinge member, each with a slidable securement pin engagement plate disposed thereon. The second or mid-frame hinge is displayable on the opposite side of that displayed with the rear and front hinges. The slidable securement pin engagement plate is biased upwardly from the hinge body by a biasing member or spring arrangement therebetween. A plurality of securement pins extend sideways outwardly of the hinge body, as may be seen in co-pending U.S. Patent Application No. 62/125,738, and incorporated herein by reference. A securable cammed hinge release handle is disposed atop an upper edge of the slidable securement pin engagement plate so as to permit engagement or release of the securement pins from within a corresponding number of angled pin engagement slots in the engagement plate. 180° movement of the cammed hinge release handle moves the slidable securement pin engagement plate into or out of secure engagement with those engagement pins, which when disengaged, permits the connected frame portions to be opened and folded into parallel alignment with one another thus forming the characterized "M" configuration of those frame members.

The foldable motorized bicycle has its rear wheel support frame, the mid-frame, the front frame and the steering column support frame folded generally linear and parallel to one another each secured by their respective slide plate hinge. The right one of the handlebars may be swiveled or a pivoted downwardly orientation from its proximal handlebar housing arranged at the upper end of the steering column.

The slide plate hinges representing the first or front hinge and the third or rear hinge may be arranged in a fully opened and planar configuration, connected by their respective hinge pins. A cable pass-through is arranged in each half body portion of each respective slide plate hinge. Pins extend off of the side of one half of the third or rear hinge when that hinge is in it's opened orientation.

The first or front hinge and the third or rear hinge are readily displayable with their respective slide plates completely disengaged on the respective hinge portions from the pins on the corresponding hinge portion there adjacent. The steering column may be folded downwardly and to the side and out of longitudinal alignment with that portion of the steering column beneath the steering column hinge, so as to enable maximum collapsability of the folded configuration of the foldable motorized bicycle. The folded four hinge plates may be in tight side-by-side positioning, when in a full open configuration of the first or front hinge and the third or rear hinge with their respective cammed hinge release handles in a securement pin engagement plate release orientation.

Thus what has been shown is a unique framed construction of a motorized two wheeled bicycle, each wheel being motorized wherein such two wheels are connected by a four-sectioned series of elongated or curvilinear frame members with a unique hinge member therebetween. Such bicycle being maximally foldable or vertically collapsible by the addition of an offset steering column collapse arrangement.

The invention thus comprises a motorized foldable bicycle assembly arranged to be collapsible from an elongated segmented frame arrangement with a set of electronically controlled motorized front and rear wheels spaced longitudinally apart on the elongated frame arrangement with the front wheel and the rear wheel arranged in an aligned, side-by-side adjacent configuration with a steering column supported handlebar arrangement correspondingly collapsed in a skewed or misaligned orientation in a space between the side-by-side wheels; and wherein the segmented frame arrangement forms a generally "M" shaped configuration in the bicycle's folded and collapsed configuration, with the apexs of the M thereof being comprised of the hinge pins. One rear portion of the frame assembly being slightly curved to accommodate the width educing features of the folded up bicycle assembly. The steering column preferably has a lockable/unlockable hinge near a mid-point thereof, the hinge having a hinge pin arranged at an acute angle with respect to the longitudinal axis of the steering column, to enable the skewed orientation of the steering column and handlebars in the bicycle's folded and collapsed configuration. The elongated segmented frame arrangement is defined by a plurality of linear frame portions interconnected by lockable/unlockable control conduit passage facilitating hinges. The handlebar arrangement is attached to the steering column by a handlebar pivot-enabling connection housing. The handlebars are foldable in an upward direction with respect to the steering column folded in its collapsed downward direction. The front wheel is connected to the elongated frame by a one-sided front wheel support frame. The rear wheel is connected to the elongated frame by a one-sided rear wheel support frame. The front wheel support frame and the rear wheel support frame are both arranged on the right side of the foldable bicycle in the bicycle's operable ridable orientation, to minimize width of the bicycle in its folded unridable configuration. The front wheel support frame and the rear wheel support frame are both arranged on the inner side of the foldable bicycle, side-by-side one another in the bicycle's folded, unridable configuration.

The invention also includes a method of folding a motorized foldable bicycle assembly into a compact, minimized, unridable configuration from an elongated ridable configuration comprises one or more of the steps of: arranging a set of frame segments in a linear arrangement each connected by a lockable/unlockable hinge connected between adjacent frame segments; connecting a one sided front wheel support frame to a motorized front wheel, which one sided front wheel support frame has an elongated foldable steering column connected thereto, the foldable steering column having a longitudinal axis with a pair of foldable handle bars each pivotally connected to a handle bar housing at an upper end thereof; connecting a one sided rear wheel support frame segment to a motorized rear wheel; and unlocking each lockable/unlockable hinge between adjacent frame segments and folding those frame segments into a generally "M" shaped orientation; pivoting downwardly each handlebar at the handlebar housing into close proximity to the elongated steering column; folding downwardly the foldable steering column about a hinge pin on a hinge arranged at a mid-point on the steering column, wherein the hinge pin on the hinge arranged at a mid-point on the steering column is disposed at an acute angle with respect to the longitudinal axis of the steering column, wherein a pair of foot rest plates are hingedly attached to a mid-frame located frame segment, wherein the one sided front wheel support frame and the one sided rear wheel support frame are in side by side relationship in the folded configuration of the foldable bicycle, wherein each lockable/unlockable hinge are cam actuated to enable the change of the hinge configuration from a locked configuration enabling linearly aligned series of frame segments to an unlocked and open hinge configuration enabling the frame segments to be folded into a side by side generally "M" like configuration, wherein the one sided rear wheel support frame segment and the one sided front wheel support frame are arranged on the same right side of the bicycle in its ridable configuration, wherein the one sided rear wheel support frame segment and the one sided front wheel support frame are in side by side relationship when the bicycle is folded up and in its unridable configuration.

BRIEF DESCRIPTION OF THE DRAWINGS

The objects and advantages of the present invention will become apparent when viewed in conjunction with the following drawings, in which.

DESCRIPTION OF THE PREFERRED EMBODIMENTS

Figure 1:
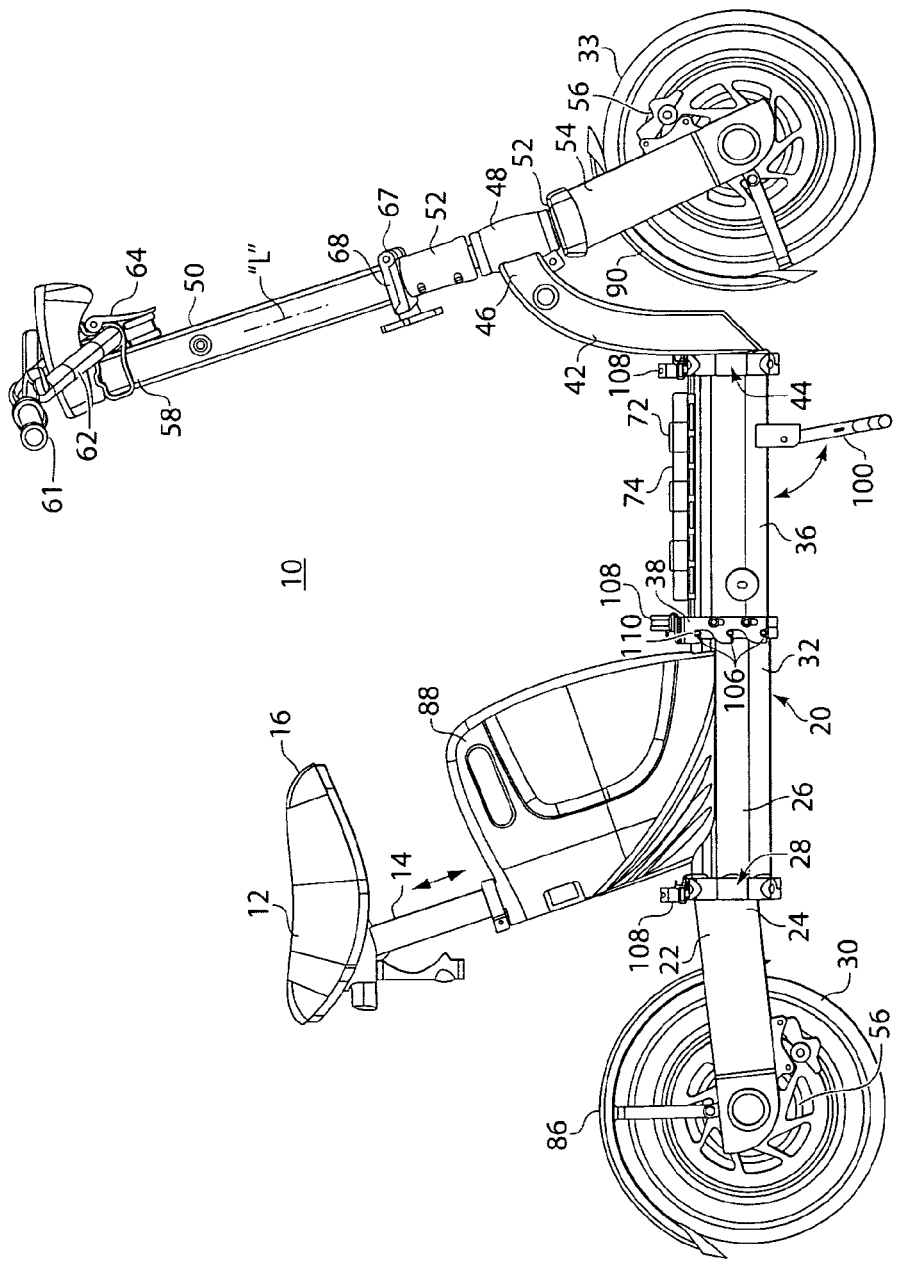
FIG. 1 is a side view (unfolded) of the right-hand side of the motorized foldable bicycle constructed according to the principles of the present invention.

Referring now to the drawings in detail, and particularly to FIG. 1, there is shown in a right-hand side view a foldable motorized bicycle 10 of the present invention (in its unfolded configuration). For purposes of representation the saddle or seat 12 shown on a telescoping seat column 14 shall have the forward end 16 of the seat 12 directed towards the front end FE of the bicycle 10, particularly apropos when it's described in it's foldable or collapsed configuration, as shown in the following figures and further described hereinbelow.

Figure 6:
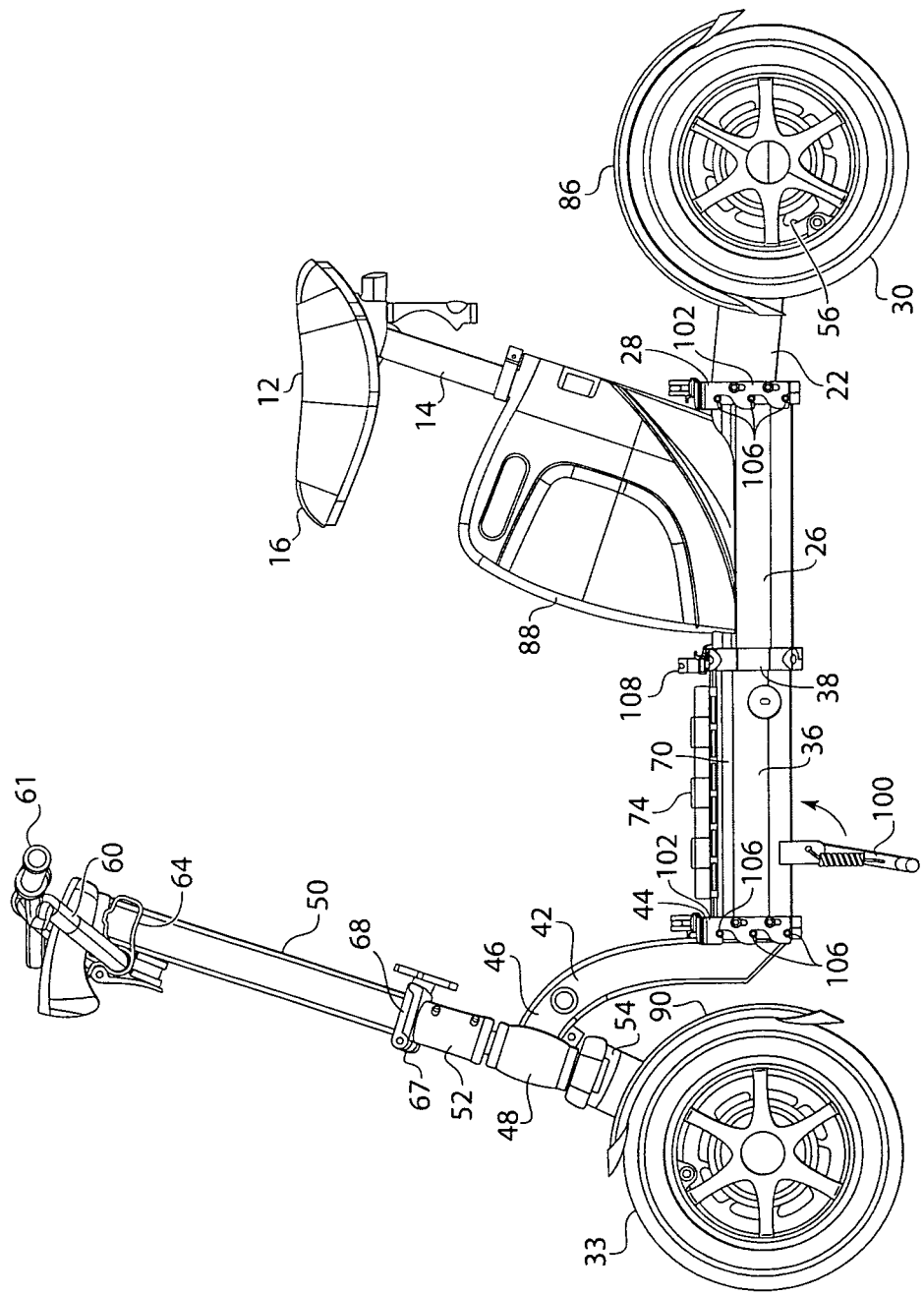
FIG. 6 is a side view of the left-hand side of the motorized foldable bicycle shown in FIG. 1.

The foldable motorized bicycle 10 of the present invention has an elongated hingedly interconnected, multi-linked, multi-foldable, segmented frame 20, best viewed in its open and elongated form in FIGS. 1 and 6, the elongated hingedly lockably and unlockably interconnected, four sectioned, multi-linked, multi-folded frame 20 comprising a bicycle width-reducing one-sided rear wheel support frame 22 hingedly attached at a front end 24 thereof to an elongated mid-frame 26, by a lockable and unlockable hinge 28 arranged therebetween. The rear wheel support frame 22 supports an individually electrically empowered, computer controlled motorized rear drive wheel 30. The rear wheel support frame 22 is attached to the mid-frame 26 by a unique "slide plate" third or rearmost lockable and unlockable multi-finger-engaging torque-minimizing hinge 28. The elongated mid-frame 26 is attached at its front end 32, to an elongated front frame 36 by a second or mid-frame "slide-plate" lockable and unlockable multi-finger-engaging torque-minimizing hinge 38, as may be seen in FIGS. 1 through 3, 6, in a locked configuration and in an open configuration, in FIGS. 9, 14, 16, 22, 23 and 24. The slide plate lockable and unlockable, multi-finger-engaging, torque-minimizing hinges 28 and 38 may be seen more specifically in U.S. Provisional Patent Application No. 62/125,738, filed Jan. 1, 2015 and U.S. Design patent application Ser. No. 29/474,755, filed Jan. 28, 2015, each incorporated herein by reference in their entirety.

The elongated front frame 36 is connectively attached to an elongated steering column forward support frame 42, of curved shape as shown in FIGS. 1 and 6, (and linear as viewed in FIG. 2) by a first or front slide-plate lockable and unlockable multi-finger-engaging, torque-minimizing hinge 44. The steering column forward support frame 42 has a forwardmost and uppermost end 46 with a steering column support bearing 48 therearound as shown in FIGS. 1, 6, 7, 8 and 9. The steering column 50 has a lower end portion which is enclosed within the steering column support bearing 48 as best seen in FIGS. 1 and 6. The steering column 50 has a lower end 52 which is secured to a bicycle width-reducing one-sided front wheel support frame 54, supporting front wheel 33, as may be seen in FIGS. 1, 5, and 6, and 11. The bicycle width-reducing one-sided front wheel support frame 54 rotatably secures an individually motorized, computer controlled, front wheel drive and braking arrangement 56. The one-sided front wheel support frame 54 and the one-sided rear wheel support frame 22 support their respective wheels 33 and 30 from the right hand side of the bicycle 10, thus enabling the unique folding of the elongated frame 20 while minimizing its width with those front wheel and rear wheel support frames 22 and 54 facing one another when they are in their folded/collapsed orientation as represented, particularly as shown in FIGS. 24 and 25, without any wheel support members on the outer side of the folded motorized bicycle 10.

Figure 9:
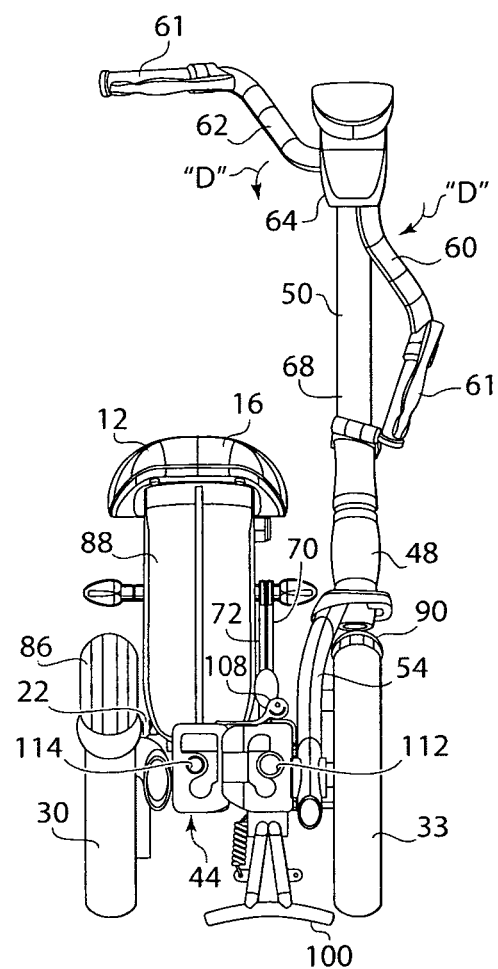
FIG. 9 is a view of the motorized foldable bicycle taken from the front, showing the frame of the bicycle in a partially collapsed configuration.
Figure 15:
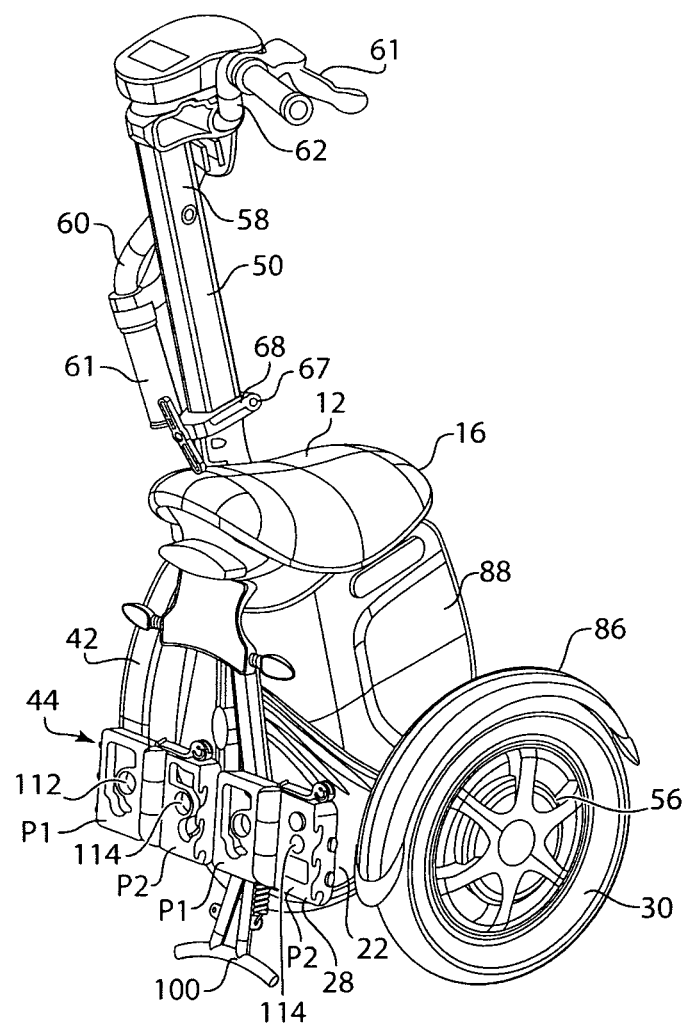
FIG. 15 is a perspective view taken from the left front of the partially collapsed motorized foldable bicycle shown in FIG. 12.
Figure 16:
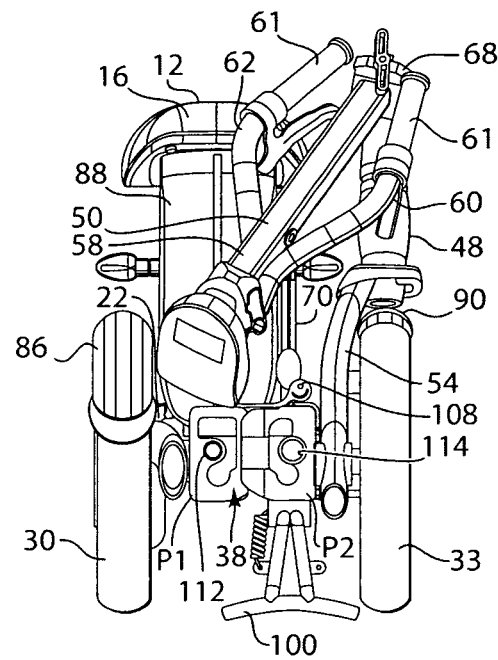
FIG. 16 is a view taken from the front and of a fully collapsed motorized foldable bicycle that shown in FIG. 1.
Figure 17:
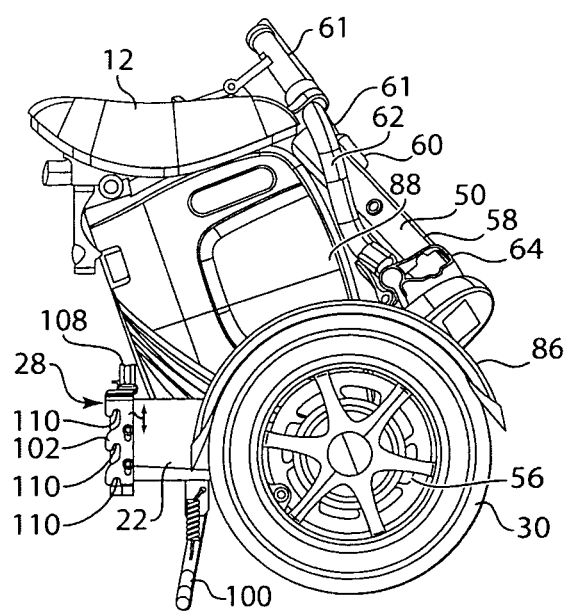
FIG. 17 is a side view taken from the right side of the fully collapsed motorized bicycle shown in FIG. 16.
Figure 18:
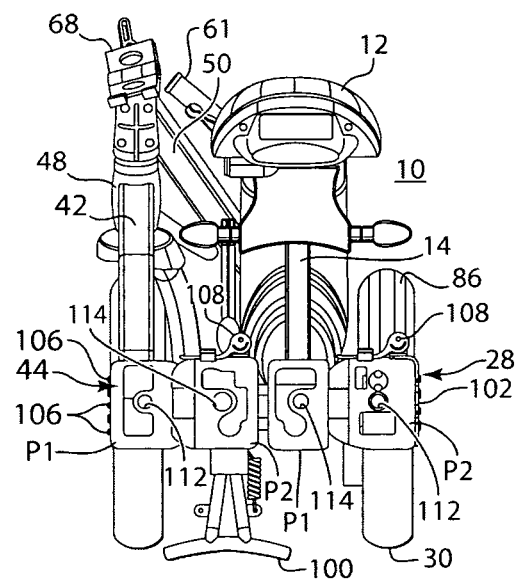
FIG. 18 is an end view taken from the rear of the fully collapsed motorized bicycle shown in FIG. 17.
Figure 19:
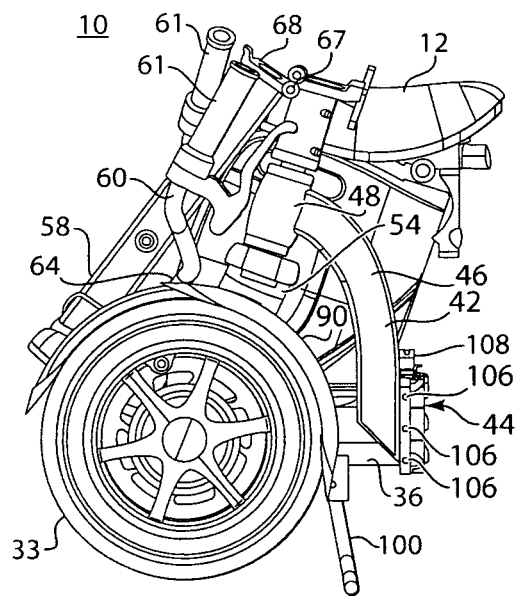
FIG. 19 is a side view taken from the left side of the fully collapsed motorized bicycle shown in FIG. 17.

The steering column 50 has an upper end 58 with a pair of handlebars 60 and 62, with their bicycle hand controls 61 shown distally thereon, each handlebar 60 and 62 pivotable downwardly, as represented by arrow "D" in FIG. 9, in a handle lockable handlebar pivot housing 64 as best represented in FIG. 9 and FIGS. 11, 12, 14, 15 and fully pivoted into close proximity to column 50, and shown in stages toward fully folded downwardly, in FIGS. 16-25. With the steering column 50 in an off-to-the-side (non-parallel) orientation as represented in FIG. 16, the handlebars 60 and 62, are still properly connected to their motorized wheel adjacent throttle and braking mechanisms 56, are directed upwardly, at an oblique angle, snugly adjacent the steering column 50, as again shown in FIG. 16. As noted, the steering column 50 has its lockable/releasable steering column hinge 68 (preferably multi-finger-engaging) angularly arranged with respect to the longitudinal axis "L" of the steering column 50, to permit the upper end of the steering column 58 to be folded about the diagonally disposed hinge pin 67 on the front side of the steering column hinge 68 and thus remain widthwise reduced on the front wheel support-frame-free side of the steering column support frame 42, as represented in FIGS. 16, 17, 18, 19, 20, 21 22, 23 and 24, showing the fully collapsed bicycle 10 in its most minimal folded configuration.

Figure 2:
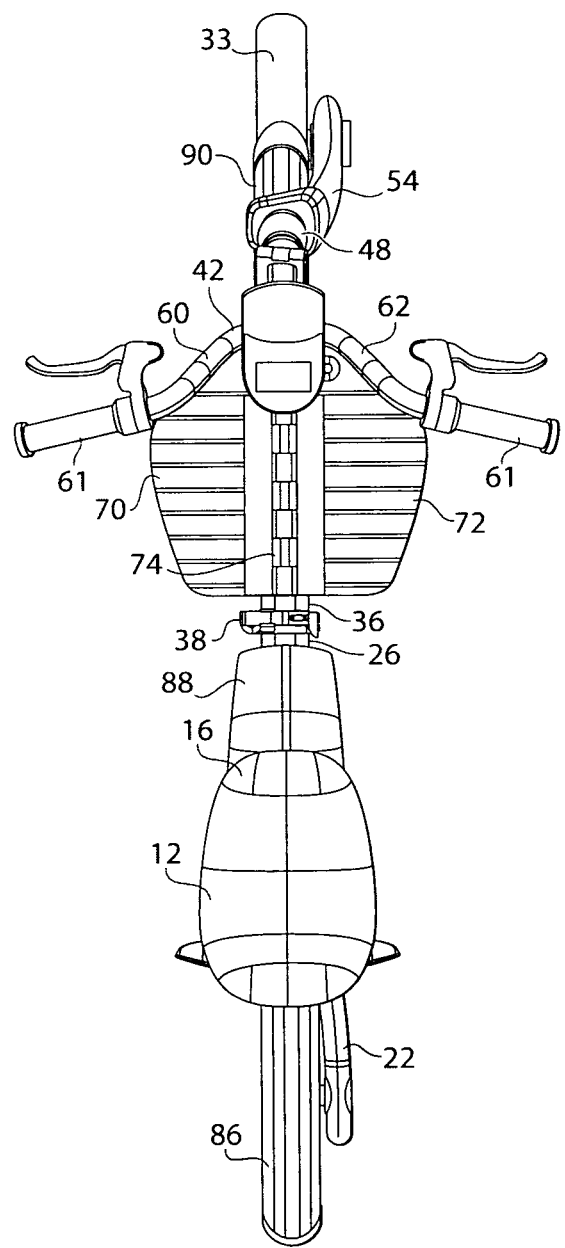
FIG. 2 is a top view of the motorized foldable bicycle shown in FIG. 1.
Figure 3:
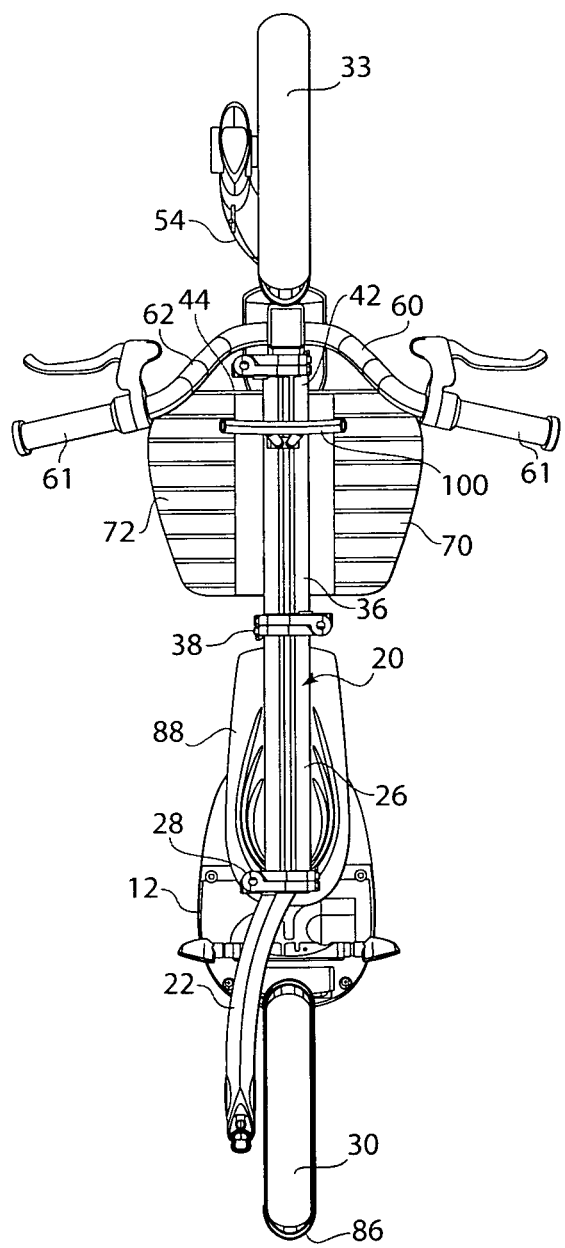
FIG. 3 is a bottom view of the motorized foldable bicycle shown in FIG. 1.

A pair of foot rest plates 70 and 72 are arranged on the top of the first or front frame 36, as seen in an edge view in FIG. 1, and in a plan view in FIG. 2 and in a bottom view in FIG. 3, connected to the top of the front frame 36 with a hinge arrangement 74. The foot rest plates 70 and 72 have the longitudinal hinge 74 therebetween so as to permit the pair of foot rest plates 70 and 72 to both be folded vertically upwardly and parallel and adjacent one another when it is desired to put the motorized foldable bicycle 10 into a collapsed configuration, as may be seen in a stepped series best appreciated as seen in FIG. 8, FIG. 9, FIG. 11, FIG. 14, FIG. 16, FIG. 18, FIG. 20 FIG. 23 and FIG. 25.

Figure 24:
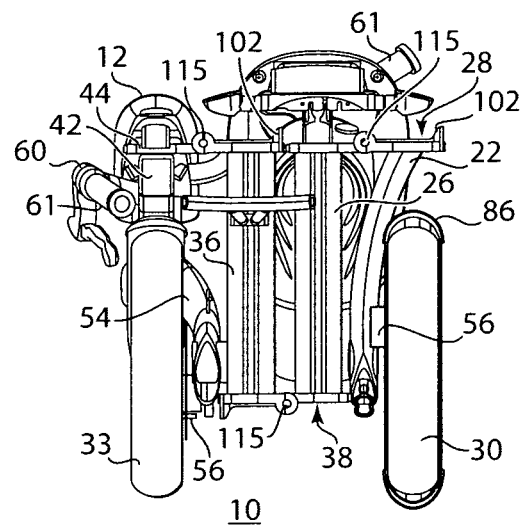
FIG. 24 is a bottom view of the collapsed motorized bicycle with one handlebar directed outwardly, and the frame members defining the folded frame in its "M" configuration.
Figure 25:
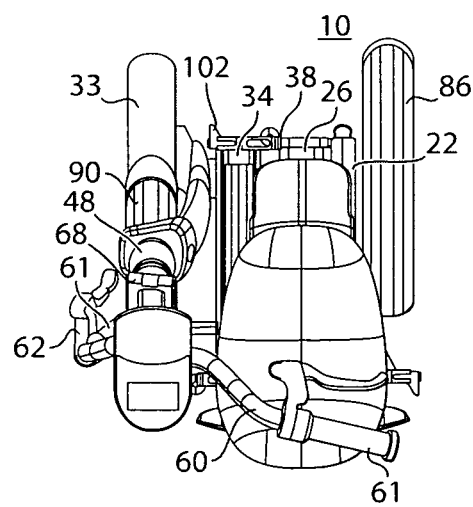
FIG. 25 is a top view of a partially collapsed bowdlerized bicycle is represented in FIG. 15.

As may be visualized from bottom-looking-up view in FIG. 24, the folded configuration with the one-sided rear wheel support frame 22, the mid frame 26, the front frame 36, and the steering column support frame 42, may with a little consideration, constitute portions of a capital "M" with the respective lockable hinges 44, 38 and 28 functioning as the respective apexes on the "M", thus foreshortening the elongated four-sectioned frame 20 by a buckling or folding onto itself multiple times. Thus the conversion from a linear frame 20, as viewed in plan format, into an "M" configuration minimizes length of the folded bicycle 10, and wherein the one-sided rear wheel support frame 22 and the one-sided front wheel support frame 54 being positioned on their respective inner sides of their wheels 30 and 33 respectively thus support their wheels 30 and 33 while effectively minimizing the width of the bicycle 10 when in its folded configuration. The rear hinge 44 and the front hinge 28 being envisioned as the apex points on the upper sides of the "M", and the mid frame hinge 38 envisionable as the middle apex of the "M" represented in FIG. 24. The forward support frame 42, the front frame 36 and the mid frame 26 being parallel to one another when viewed as in their vertical planes, the rear wheel support frame 22, being slightly curved, thus displaying a generally M shape in a bottom view (see FIG. 24).

FIG. 2 represents a top plan view of the foldable motorized bicycle 10 shown in FIG. 1. The one-sided rear wheel support frame 22 may be seen as arranged on the right-hand side of the rear wheel 30, which is covered by a rear fender 86. The saddle 12 is shown disposed over a battery housing and computer control arrangement 88. The second or mid-frame lockable hinge 38 is shown just rearwardly of the foldable foot rest plates 70 and 72. The one-sided front wheel support frame 54 is shown directed towards the right-hand side of the front wheel 33, partially covered by a front wheel fender 90.

Figure 5:
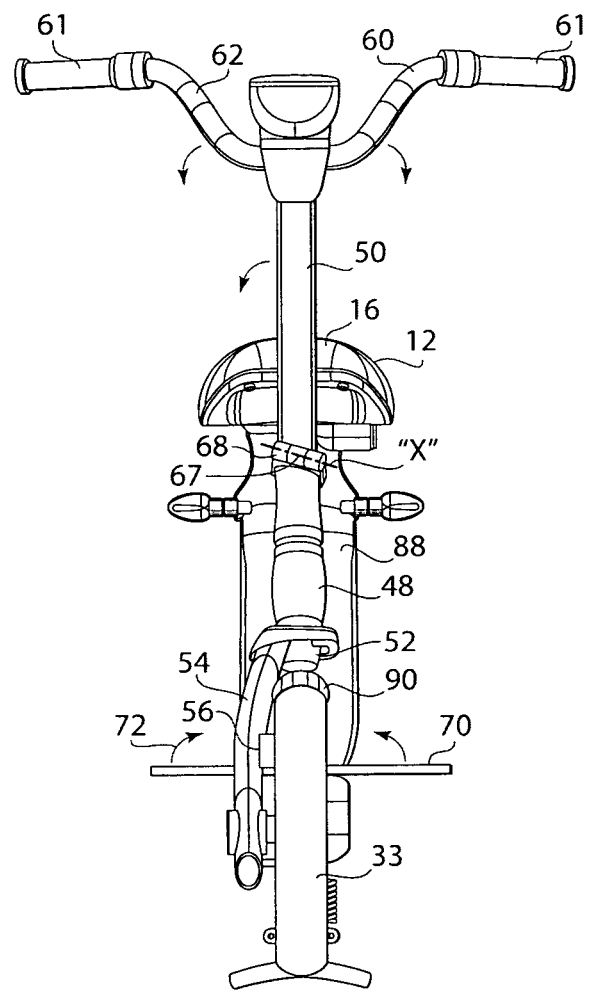
FIG. 5 is a front view of the motorized foldable bicycle shown in FIG. 1.

The steering column 50 holding the pair of handlebars 60 and 62, is shown with a steering column hinge 68 at a slight angle of about 30 degrees with respect to the longitudinal axis "L" of the steering column 50, as may be seen in FIG. 5. The hinge pin 67 is diagonally arranged on the front side of the hinge 68, thus enabling the steering column 50 to be skewably folded downwardly to its right, as may be seen in FIG. 16, also with its associated handlebars 62 and 60 pivoted inwardly toward the steering column 50, and nestled between the respective front and rear wheels 33 and 30, as shown in FIG. 16.

Figure 4:
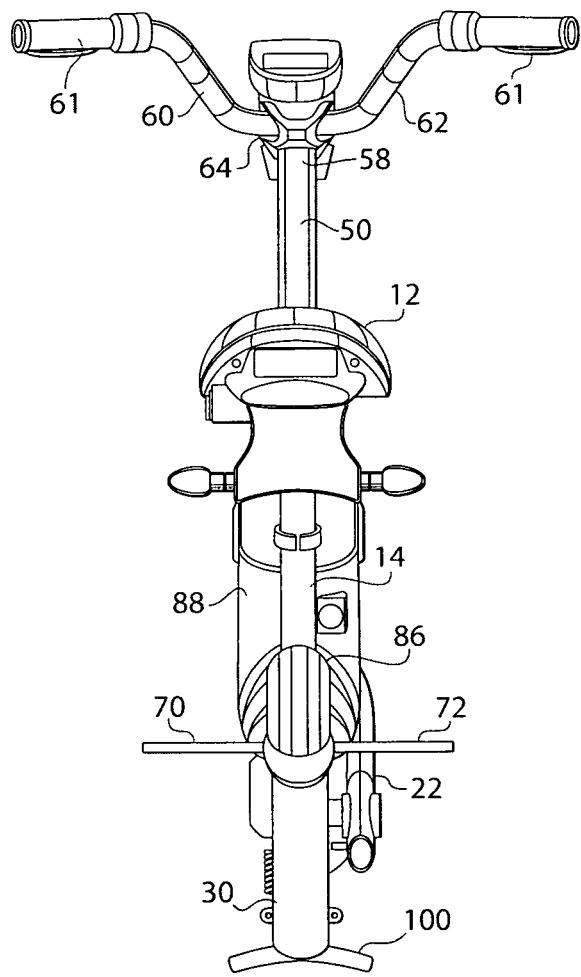
FIG. 4 is a rear view of the motorized foldable bicycle shown in FIG. 1.

A bottom view of the foldable motorized bicycle 10 is shown in FIG. 3 and a plan view of the foldable motorized bicycle 10 is shown in FIG. 2. The mid-frame 20 and the front frame 36 are shown connected by the lockable second or mid-hinge 38 and the one-sided rear wheel support frame 22 is shown connected to the mid-frame 26 by the third or rear lockable hinge 28. One-sided rear wheel support frame 22 and the one sided front wheel support frame 54 each support their electrically empowered wheels 30 and 33 respectively, from the same or right hand side of the bicycle 10 so as to minimize width dimensions thereof when the bicycle 10 is fully folded up, as may be appreciated in FIGS. 16, 18, 22 and 23. Note also that the first or front lockable hinge 44 is shown in FIG. 3, from the bottom, as connected to the steering column support frame 42. FIG. 4 shows the foldable motorized bicycle from the rear thereof with its kickstand 100 disposed downwardly. The saddle or seat 12 is held by a telescoping seat column 14, whose length is adjustable, is best shown in FIGS. 1 and 6.

Viewing FIG. 5, there is best represented a front view of the foldable motorized bicycle 10 with the steering column lockable/releasable hinge 68 having a hinge pin 67 defining the pivot axis "X" which is arranged at an acute angle of about 60 degrees with respect to the longitudinal axis "L" of the steering column 50, so as to enable the folding of the steering column 50 downwardly and snugly to one side and non-parallel to the lower portion of the steering column 52 of the bicycle 10, as shown in FIG. 16, with the steering column 50 directed downwardly and the handlebars 60 and 62 in close snug alignment with the steering column 50 when the bicycle 10 is in its collapsed or folded orientation.

The representation shown in FIG. 6 displays the left side view of the foldable motorized bicycle 10 showing the first or front lockable hinge member 44 and the third or rear lockable hinge member 28, each with a slidable securement pin engagement plate 102 disposed thereon. The second or mid-frame lockable hinge 38 is likewise shown in FIG. 6 from the opposite side of that shown of the rear and front lockable hinges 44 and 28 respectively. The slidable securement pin engagement plate 102 is biased upwardly from the body frame of each lockable hinge 28, 38 and 44, by a biasing member or spring arrangement 104 therebetween, as may be seen in FIGS. 16 and 17, and also more definitively viewed in the aforementioned applications: U.S. Provisional Patent Application No. 62/125,738, filed Jan. 29, 2015 and U.S. Design patent application Ser. No. 29/474,755, filed Jan. 28, 2015, each again incorporated herein by reference in their entirety.

As may be seen in FIG. 6, plurality of securement pins 106 extend sideways outwardly of a first pivotable side the body of the lockable hinge 28 and 44, and in lockable hinge 38, shown in FIG. 1. A securable cammed hinge release handle 108 is disposed atop an upper edge of the slidable securement pin engagement plate 102 arranged on the second or other side of the lockable hinge so as to permit engagement or release of the securement pins 106 on the first side of the body of the (each) lockable hinge 28/32/44 from within a corresponding number of angled pin engagement slots 110 on the body of the slidable engagement plate 110 secured to the outer edge of the second side, of the (each) lockable hinges 28/38/44, as may be seen in FIGS. 1 and 6. 180° movement of the cammed hinge release handle 108 moves the slidable securement pin engagement plate 102 into or out of secure engagement with those engagement pins 106, which when disengaged, permits the hingedly connected frame portions to be opened and folded into a common plane, as may be visualized by hinge 44 shown in FIG. 9, and also in folded-open, common-plane-parallel alignment with one another, as represented in FIG. 16, thus enabling the characterized "M" configuration of those bicycle frame members 22, 26, 36 and 42, as may be visualized from FIG. 24.

Further, each lockable hinge 28, 36 and 44 have a conduit port 112 and 114 respectively on each side of their body portions of such lockable hinge 28, 36 and 44. Such ports 112 and 114 in each leaf of the hinges enables electrical and control cables to extend therethrough, (not shown for clarity of the figures).

Figure 7:
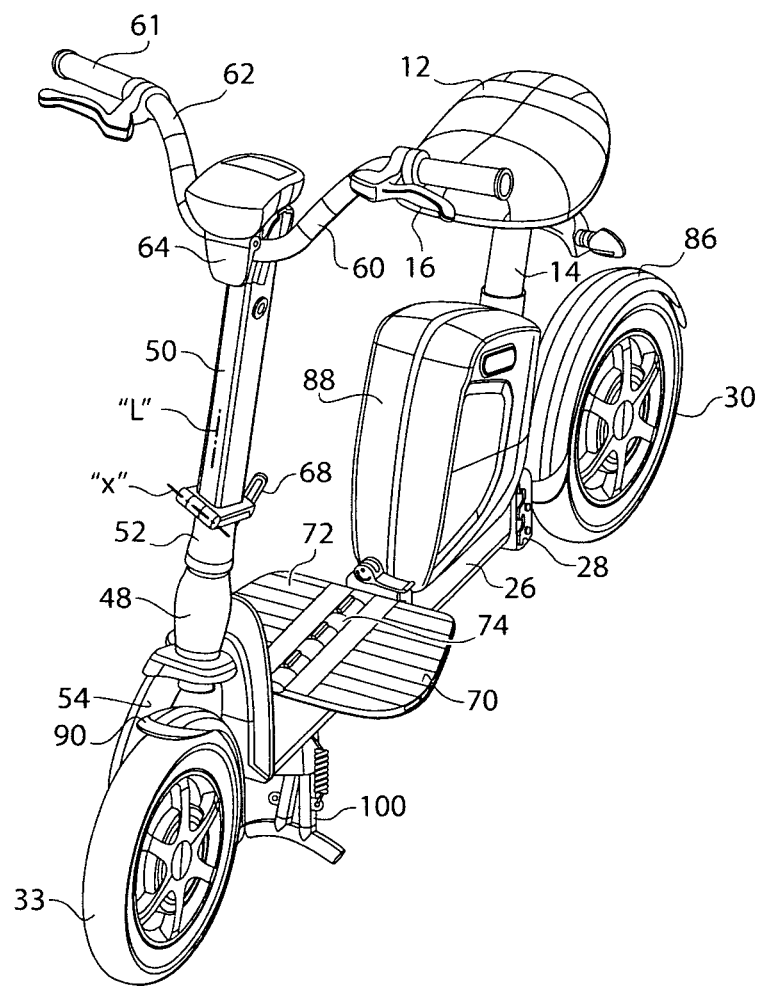
FIG. 7 is a perspective view taken from the front left side of the motorized foldable bicycle shown in FIG. 1.
Figure 8:
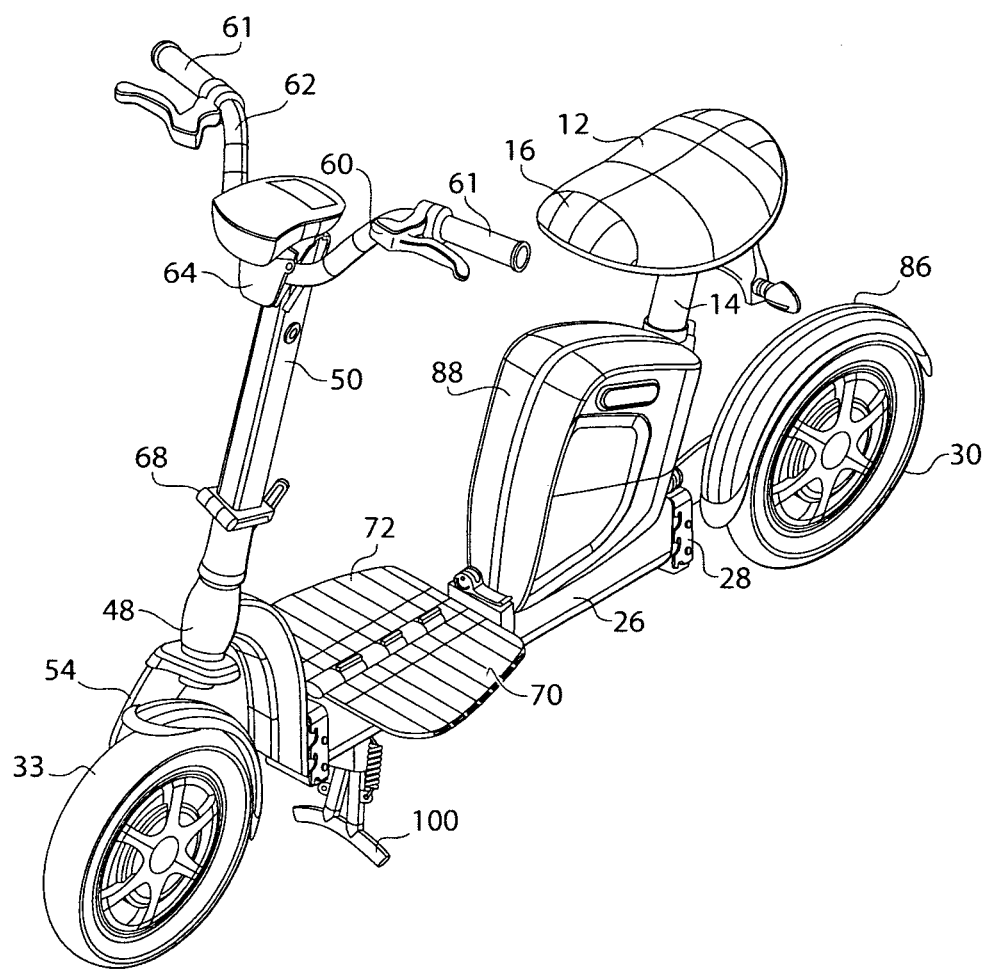
FIG. 8 is a further perspective view taken from the front left side of the motorized foldable bicycle shown in FIG. 1.
Figure 10:
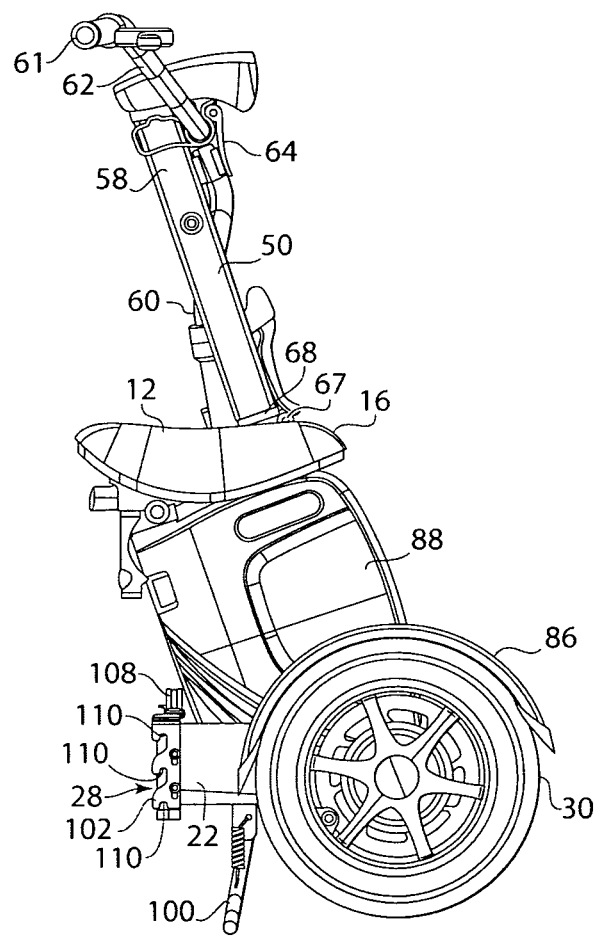
FIG. 10 is a side view of the partially collapsed motorized foldable bicycle shown in FIG. 9.

The foldable motorized bicycle 10 is represented in FIGS. 7 and 8, from a perspective view of its front left side. FIG. 9 shows the foldable motorized bicycle 10 with its rear wheel support frame 22, the mid-frame 26, the front frame 36 and the steering column support frame 42 folded generally parallel to one another each secured by their respective slide plate hinges. FIG. 9 also represents the right one 62 of the handlebars 60/62 in a swiveled or a pivoted downwardly orientation from its proximal handlebar housing 64 arranged at the upper end 58 of the steering column 50. FIG. 10 represents from the right side of the partially collapsed foldable bicycle 10 which is represented otherwise in FIG.

Figure 11:
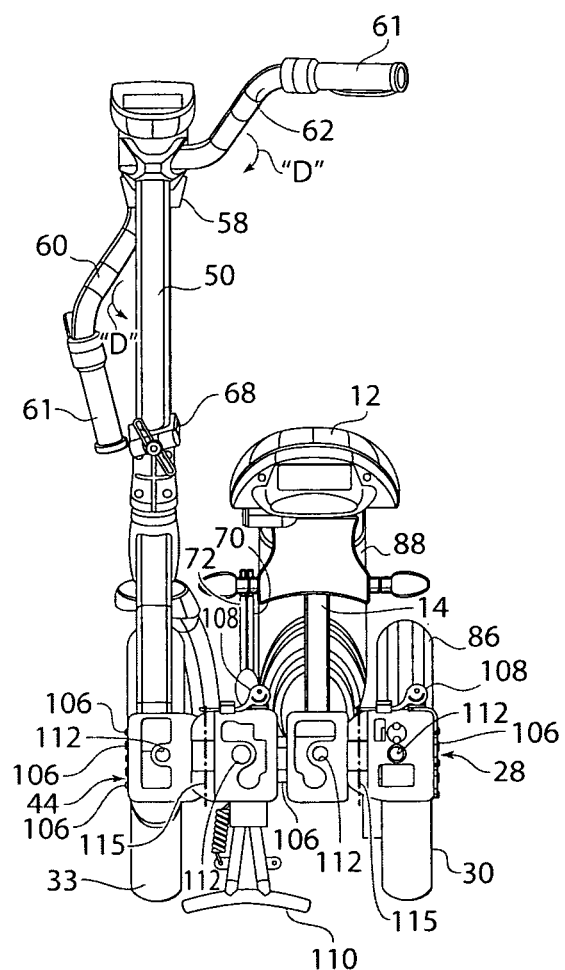
FIG. 11 is a view of the motorized foldable bicycle taken from the front, showing the frame of the bicycle in a partially collapsed configuration.

9. FIG. 11 represents from the rearview, the partially collapsed foldable bicycle shown in FIGS. 9 and 10. Only the left handlebar 60 has been folded down at this point. The slide plate hinges representing the first or front lockable hinge 44 and the third or rear lockable hinge 28 may be seen in a fully opened and in co-planar configuration, pivotally connected by their respective hinge pins 115. A cable pass-through port 112 may be also seen in each half body portion of each respective slide plate hinge 44 and 28.

Figure 12:
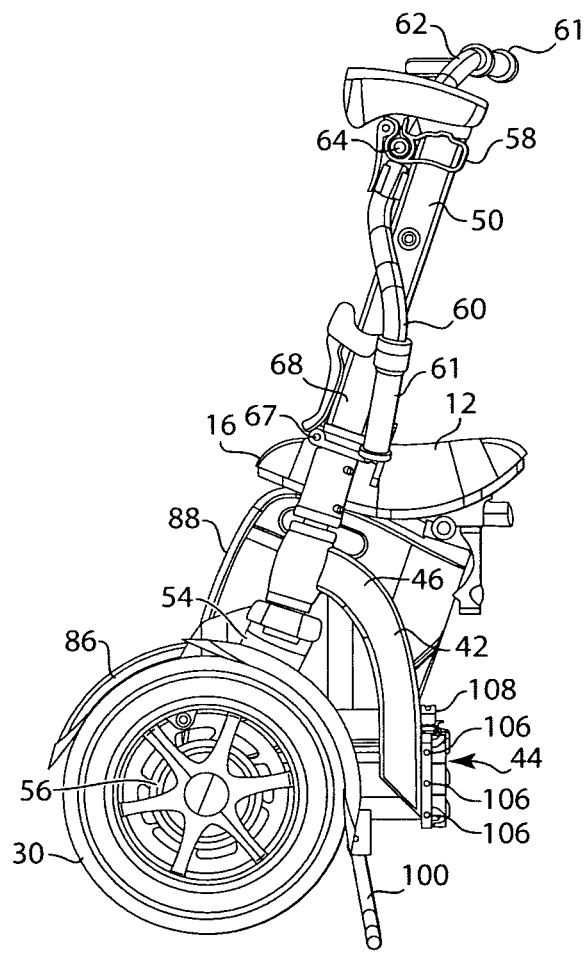
FIG. 12 is a side view of the partially collapsed motorized foldable bicycle as shown in FIG. 11.
Figure 13:
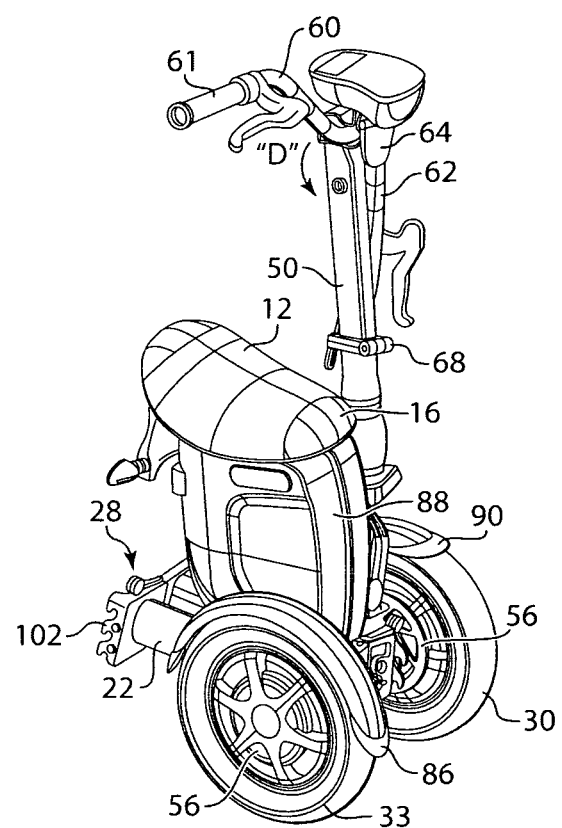
FIG. 13 is a perspective view taken from the left front of the partially collapsed motorized foldable bicycle shown in FIG. 12.
Figure 14:
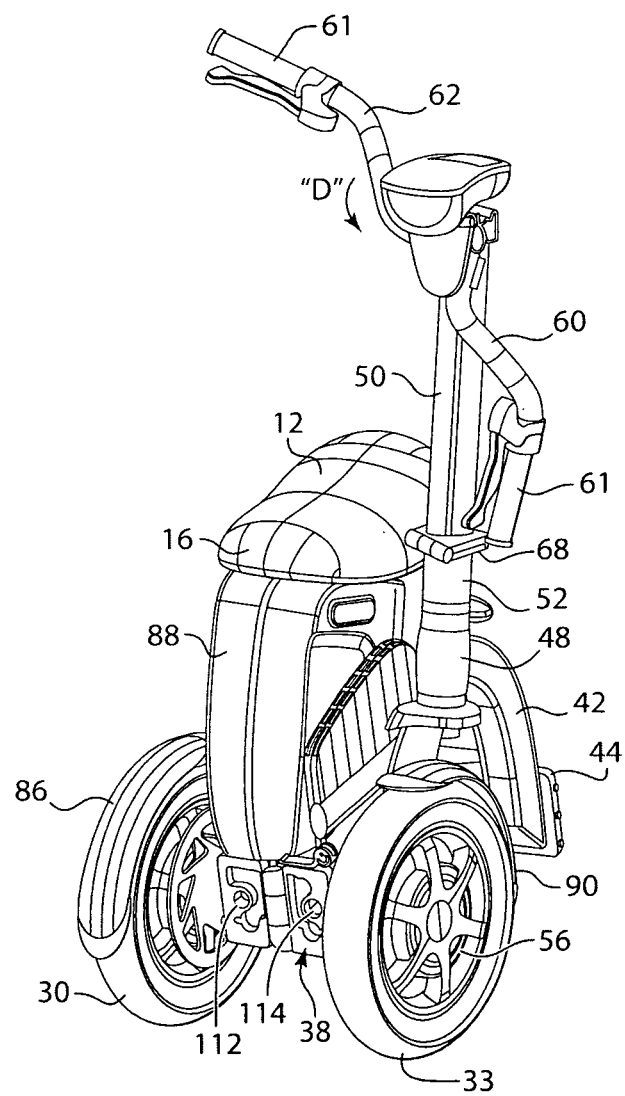
FIG. 14 is a perspective view taken from the right front of the partially collapsed motorized foldable bicycle shown in FIG. 12.

FIG. 12 shows in a side view the foldable motorized bicycle represented in FIG. 11, with the seat support column 14 fully telescoped downwardly. FIG. 12 also shows the pins 106 extending off of the side edge of one half of the third or rear lockable hinge 28 with that lockable hinge in its opened orientation. That configuration of the foldable motorized bicycle 10 is again represented in FIGS. 13, 14 and 15. The motor and brake arrangement 56 for the rear wheel 30 is readily viewable from viewing FIG. 14, the control conduits (not shown for clarity of the figures) for which extend through the conduit/cable pass-through ports 112 and 114 in the half-body components P1 and P2 of each lockable hinge 28/36/44.

The first or front lockable hinge 44 and the third or rear lockable hinge 28 are readily displayed in FIG. 15 with their respective leafs or side plates P1 and P2 completely disengaged from the pins 106 on P1 from the corresponding slots 110 on the slide plate 102 on P2 of the lockable hinge 28.

FIG. 16 represents the steering column 50 folded downwardly and to the side and out of longitudinal alignment with that portion of the steering column 50 beneath the steering column hinge 68, so as to enable maximum collapsability of the folded configuration of the foldable motorized bicycle 10. Such representation is also presented in a side view in FIGS. 17 and 19, and as a rearview in FIG. 18.

Figure 20:
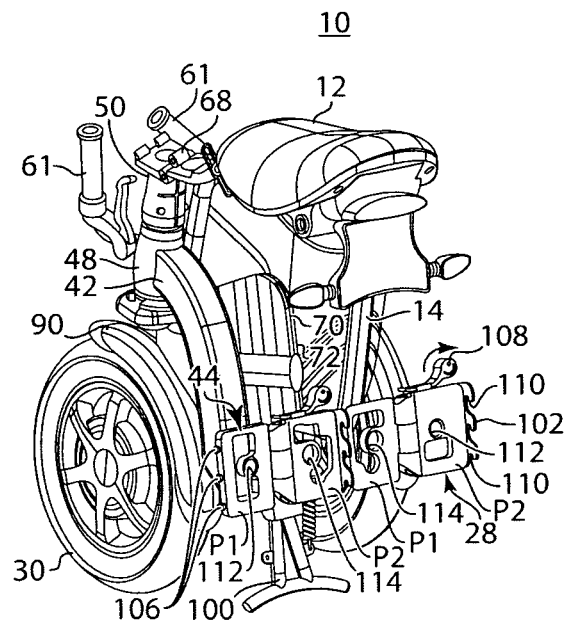
FIG. 20 is a perspective view taken from the left rear of the fully collapsed motorized bicycle shown in FIG. 17.
Figure 21:
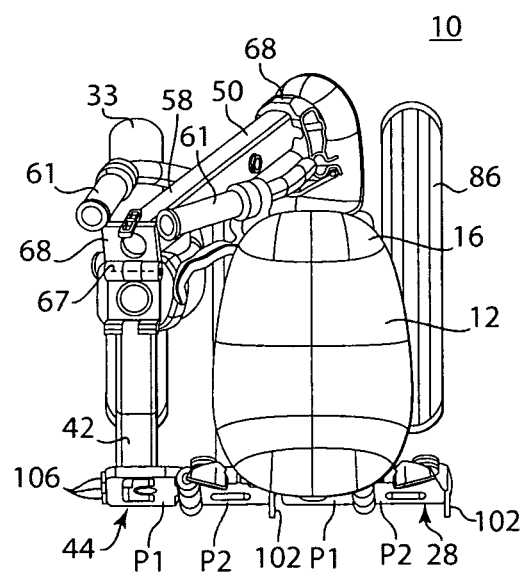
FIG. 21 is a top or plan view of the fully collapsed motorized bicycle shown in FIG. 17.
Figure 22:
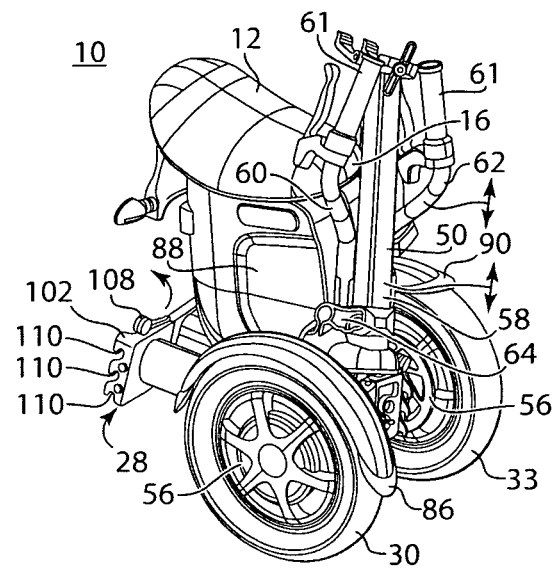
FIG. 22 is a perspective view taken from the right front side of the fully collapsed motorized bicycle shown in FIG. 17.
Figure 23:
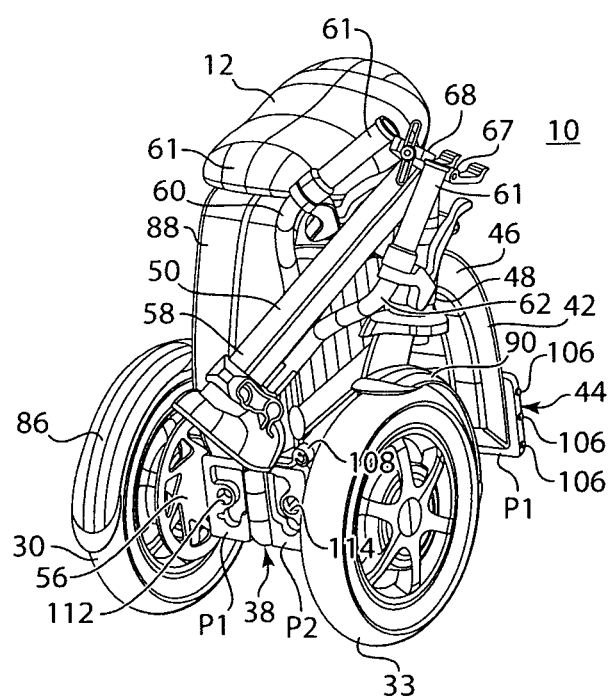
FIG. 23 is a perspective view taken from the left front side of the fully collapsed motorized bicycle shown in FIG. 17.

FIG. 20 more clearly shows the folded for plates in tight side-by-side positioning, along with a full open configuration of the first storefront hinge and the third or rear hinge with their respective cammed hinge release handles in a securement pin engagement plate release orientation. FIGS. 16, 17, 18, 19 20, 21, 22, and 23 showing the fully inwardly articulated motorized bicycle 10. FIG. 24 and FIG. 25 showing one handle 60 in an upwardly directed orientation.

Thus what has been shown is a unique framed construction of a motorized two wheeled bicycle 10, each wheel 30 and 33 having controllable/breakable electric motor arrangements 56 wherein such two wheels 30 and 33 are connected by a series of elongated frame members 22, 26, 36 and 42 lockably in a hinged torque-limited controlled arrangement, connected to one another in a linear fashion with a unique lockable/unlockable hinge member 28, 36, 44 respectively, therebetween. Such motorized bicycle 10 being maximally foldable or collapsible by the inclusion of an angularly offset steering column 50 collapse arrangement and one-side-only wheel support frame members 22 and 54.

The invention claimed is:

1. A motorized foldable bicycle assembly arranged to be foladably collapsible from a ridable elongated, segmented four sectioned frame arrangement consisting of a forward support frame, a front frame, a mid frame and a rear wheel support frame, with a set of electronically controlled motorized front and rear wheels spaced longitudinally apart one on each end of the four-sectioned elongated frame arrangement, into an unridable configuration wherein the front wheel and the rear wheel are arranged in an aligned, side-by-side adjacent configuration, each section of the frame arrangement are interconnected by a slidable locking-plate cam member connect-and-release hinge arrangement, the respective hinge arrangements pivotable about a vertical axis to enable horizontal displacement of the sections of the frame arrangement with respect to one another, and with a steering column supported handlebar arrangement correspondingly folded into a skewed or misaligned orientation in a space between the side-by-side wheels; and
wherein the segmented frame arrangement comprise a generally "M" configuration in the bicycle's folded and collapsed unridable configuration with three of the four frame sections are parallel to one another in a vertical plane, in the bicycle assembly's folded unridable configuration when viewed from the bottom of the assembly.

2. The motorized foldable bicycle assembly as recited in claim 1, wherein the steering column has a lockable/unlockable hinge near a mid-point thereof, the hinge having a hinge pin arranged at an acute angle with respect to the longitudinal axis of the steering column, to enable the skewed orientation of the steering column and handlebars in the bicycle's folded and collapsed configuration.

3. The motorized foldable bicycle assembly as recited in claim 1, wherein the handlebar arrangement is attached to the steering column by a handlebar pivot-enabling handlebar-lockable connection housing.

4. The motorized foldable bicycle assembly as recited in claim 3, wherein the handlebars are folded in an upward direction with respect to the steering column folded in its collapsed downward direction.

5. The motorized foldable bicycle assembly as recited in claim 1, wherein the front wheel is connected to the elongated frame by a one-sided front wheel support frame.

6. The motorized foldable bicycle assembly as recited in claim 5, wherein the rear wheel is connected to the elongated frame by a one-sided rear wheel support frame.

7. The motorized foldable bicycle assembly as recited in claim 6, wherein the front wheel support frame and the rear wheel support frame are both arranged on the right side of the foldable bicycle in the bicycle's operable ridable orientation, to minimize width of the bicycle in its folded unridable configuration and to minimize the bicycle assembly's outer side projections.

8. The motorized foldable bicycle assembly as recited in claim 7, wherein the front wheel support frame and the rear wheel support frame are both arranged on the inner side of the foldable bicycle, side-by-side one another in the bicycles folded, unridable configuration.

9. The motorized foldable bicycle assembly as recited in claim 1, wherein the forward support frame, the front frame and the mid frame are arranged parallel to one another in their respective vertical planes, when the foldable bicycle is arranged into its folded up collapsed configuration.

10. A method of folding a motorized foldable bicycle assembly into a compact, minimized, unridable configuration from an elongated ridable configuration to a folded up compact unridable configuration, comprising:
arranging a set of frame segments in a linear arrangement each interconnected by a lockable/unlockable slidable locking-plate cam member connect and release hinge arrangement, the respective hinge arrangements pivotable about a vertical axis to enable horizontal displacement of the segments of the frame arrangement with respect to one another;
connecting a one sided front wheel support frame segment to a motorized front wheel, which one sided front wheel support frame segment has an elongated foldable steering column connected thereto, the foldable steering column having a longitudinal axis with a pair of foldable handle bars each pivotally connected to a handle bar housing at an upper end thereof;

connecting a one sided rear wheel support frame segment to a motorized rear wheel; and unlocking each lockable/unlockable hinge between adjacent frame segments and folding those frame segments generally into a "M" shape in planar unridable orientation.

11. The method of folding a motorized foldable bicycle assembly into a compact minimized configuration from an elongated ridable configuration to a folded up unridable configuration as recited in claim 10, including:

pivoting downwardly each handlebar at the handlebar housing, into close proximity to the elongated steering column.

12. The method of folding a motorized foldable bicycle assembly into a compact minimized configuration from an elongated ridable configuration to a folded up unridable configuration as recited in claim 11, including:

folding downwardly the foldable steering column about a hinge pin on a hinge arranged at a mid-point on the steering column.

13. The method of folding a motorized foldable bicycle assembly into a compact minimized configuration from an elongated ridable configuration to a folded up unridable configuration as recited in claim 12, wherein the hinge pin on the hinge arranged at a mid-point on the steering column is disposed at an acute angle with respect to the longitudinal axis of the steering column.

14. The method of folding a motorized foldable bicycle assembly into a compact minimized configuration from an elongated ridable configuration to a folded up unridable configuration as recited in claim 13, wherein a pair of foot rest plates are hingedly attached to a mid-frame located frame segment.

15. The method of folding a motorized foldable bicycle assembly into a compact minimized configuration from an elongated ridable configuration to a folded up unridable configuration as recited in claim 10, wherein the one sided front wheel support frame and the one sided rear wheel support frame are in side by side relationship in the folded configuration of the foldable bicycle.

16. The method of folding a motorized foldable bicycle assembly into a compact minimized configuration from an elongated ridable configuration to a folded up unridable configuration s recited in claim 10, wherein each lockable/unlockable hinge are cam actuated to enable the change of the hinge configuration from a locked configuration enabling linearly aligned series of frame segments to an unlocked and open hinge configuration enabling the frame segments to be folded into a side by side configuration.

17. The method of folding a motorized foldable bicycle assembly into a compact minimized configuration from an elongated ridable configuration to a folded up unridable configuration as recited in claim 10, wherein the one sided rear wheel support frame segment and the one sided front wheel support frame are arranged on the same right side of the bicycle in its ridable configuration.

18. The method of folding a motorized foldable bicycle assembly into a compact minimized configuration from an elongated ridable configuration to a folded up unridable configuration as recited in claim 16, wherein the one sided rear wheel support frame segment and the one sided front wheel support frame are in side by side relationship when the bicycle is folded up and in its unridable configuration.

\* \* \* \* \*